E. WRIGHT.
Mechanism for Operating Doffer-Combs.

No. 208,946.    Patented Oct. 15, 1878.

Witnesses
D. Harrington
S. R. Barton

Inventor
Edward Wright
By Chas. H. Burleigh
Att'y.

UNITED STATES PATENT OFFICE.

EDWARD WRIGHT, OF WORCESTER, MASSACHUSETTS.

IMPROVEMENT IN MECHANISMS FOR OPERATING DOFFER-COMBS.

Specification forming part of Letters Patent No. 208,946, dated October 15, 1878; application filed July 29, 1878.

*To all whom it may concern:*

Be it known that I, EDWARD WRIGHT, of Worcester, in the county of Worcester and State of Massachusetts, have invented certain new and useful Improvements in Mechanisms for Operating Doffer-Combs; and I declare the following to be a description of my said invention sufficiently full, clear, and exact to enable others skilled in the art to which it appertains to make and use the same, reference being had to the accompanying drawings, which form a part of this specification, and in which—

Figure 2:
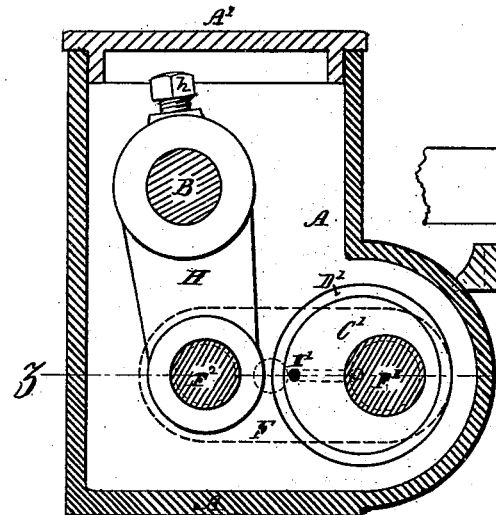
Figure 3:
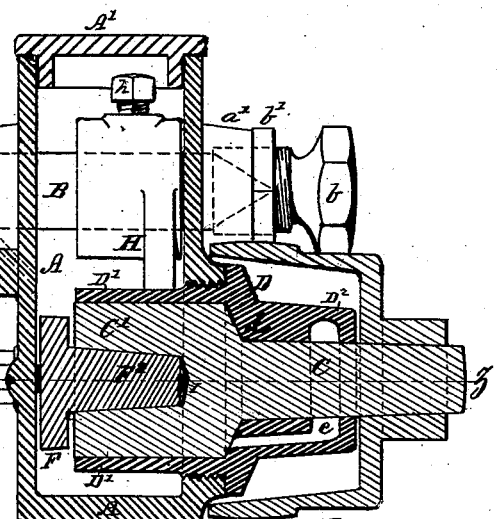
Figure 1:
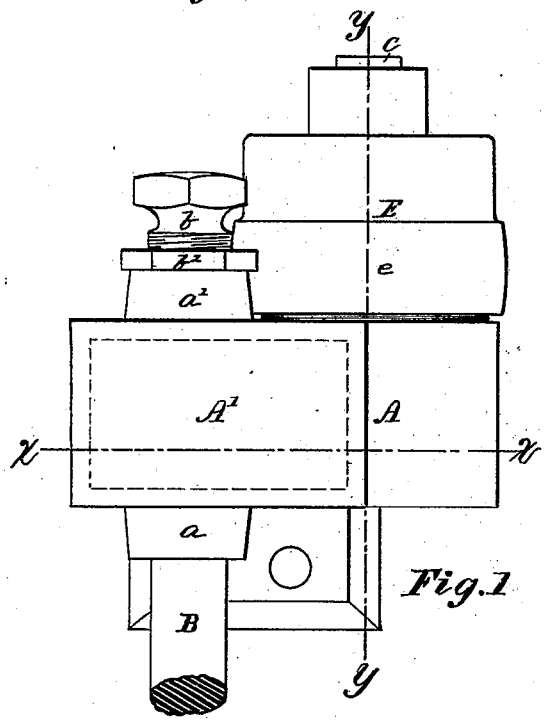
Figure 4:
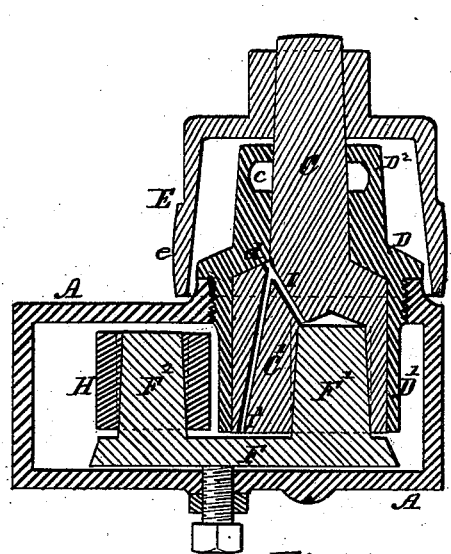

Figure 1 represents a plan view of my improved doffer-comb head. Fig. 2 represents a vertical section of the same at line $x$ $x$, Fig. 1. Fig. 3 represents a vertical section at line $y$ $y$, Fig. 1; and Fig. 4 represents a horizontal section at line $z$ $z$, Figs. 2 and 3.

This invention relates to certain improvements in the construction of mechanism for imparting vibratory movement to doffer-combs on carding-machines, the object thereof being to provide a simple, durable, and efficient device, capable of running at high speed with but little friction or wear and without noise; and my invention consists in the mechanism constructed and organized for operation in the peculiar manner hereinafter described, the particular features claimed being hereinafter definitely specified.

In the drawings, the part marked A is the case, tank, or reservoir, within which the connections are inclosed so as to be surrounded with oil and constantly lubricated while in operation. Said case A is made in the form indicated, with a top opening and cover, A′, and with side bosses or bearings, $a$ $a'$, near its upper part, in which the end of the vibrating comb-shaft B is supported. One of the bearings, $a'$, is provided with a hollow-ended screw, $b$, and check-nut $b'$, for sustaining and adjusting the shaft B endwise, said shaft being made with a conical extremity, which fits into the hollow of the screw $b$, as indicated by dotted lines in Fig. 3. C indicates the operating-shaft or revolving stud, provided with an enlarged cylindrical inner end or head, C′, containing the eccentric devices and a projecting portion or end to receive the driving-pulley. Said shaft is supported to turn within a bearing-sleeve, D, which is screwed into a threaded opening at one side of the casing A, near its lower part, as shown. The bearing-sleeve D extends inward from the threaded portion, as at $D^1$, so as to embrace and support the entire length, or nearly so, of the head C′, while at the outside of the case the bearing-sleeve D extends for a considerable distance, as at $D^2$, for supporting the smaller portion of the shaft C, which, in the present instance, is slightly tapered toward its end. An angle or shoulder is formed centrally on the shaft C and bearing D, as at $d$, which prevents the shaft from being crowded back within the bearing-sleeve, and, with the long bearing-surfaces at either side, causes the stud or shaft C to revolve true and wear slowly and evenly.

An annular groove and oil-return channel, $c$, is formed in the outer end of the bearing-sleeve D, as indicated. The driving-pulley E is made of the peculiar form shown, and is mounted on the outwardly-projecting end of the shaft C, said pulley being formed cup-shaped to extend over the bearing D, and thus bring the working or belt face $e$ nearer in line with the central part of the bearing-sleeve, so that the strain of the driving-belt can cause but little angular pressure of the shaft C against its bearing, thus obviating unequal wear at the ends of the bearing-surfaces, and causing the parts to revolve with a true and steady movement.

The head C′ is provided with a hole or chamber for the reception of the crank or pin F′ of the connecting-bar F. Said chamber is drilled in from the face of the head C′, parallel with but eccentric to the axis thereof, and in the present instance is slightly tapering, as shown. The crank or pin $F^1$ of the connecting-bar is made of a proper form and size to fill the opening, or nearly so, thus making up the weight of metal drilled out and preserving the balance of the head C′.

An oil passage or hole, I, is formed within the head C′, in the peculiar manner indicated in Fig. 4. Said passage extends from the inner end of the eccentric-crank, opening at a position near the axis of the shaft C diagonally outward to the angle $d$ of the bearing, and from thence outward to its discharge-orifice I′, near the periphery, and in the face of the head C'. Rapid revolution of the shaft C causes the oil, by centrifugal force, to be drawn inward around the pin $F^1$ and discharged at the orifice I'. It also tends to draw the oil away from the outer end of the bearing $D^2$, and prevent overflow at the junction of the shaft and bearing. The passage I may, if desired, be stopped where it opens to the bearing at $d$, so that the entire draft of oil will be from the central part of the head about the eccentrically-arranged connection or pin $F^1$.

A crank or arm, H, is firmly attached at its upper end to the vibrating shaft B by the set-screw $h$, and extends downward within the case A to meet the connecting-bar F, to which it is joined by having its end passed over the pin $F^2$ of said bar F, in the manner shown.

The connecting-bar F is made in a single piece with the studs or crank-pins $F^1$ and $F^2$, the axes of said pins being arranged perpendicular to the bar F and parallel with each other and the shafts B and C, so that the strain and wear will be equally distributed along the full length of the pins, and all liability of their working loose or cramping avoided. At the back of the bar F a set-screw, $f$, is passed through the casing A, by means of which the bar F and crank-pins $F^1$ and $F^2$ may be adjusted to close their bearings and take up any looseness occasioned by wear on the pins.

If preferred, the pins $F^1$ $F^2$ may be made straight instead of tapered, and the set-screw $f$ may be omitted.

When set up for operation the tank A is supplied with oil to a depth about level with the axis of the driving-shaft C.

What I claim as new and of my invention, and desire to secure by Letters Patent, is—

1. In combination with the comb-shaft B, having arm H, the revolving shaft C, having eccentrically-chambered head C', and the connecting-bar F, provided with pins $F^1$ $F^2$, arranged to work within the head C' and arm H, substantially as set forth.

2. In combination, substantially as described, the eccentrically-chambered shaft C, vibrating arm H, connecting-bar F, having tapered pins $F^1$ $F^2$, and the set-screw $f$, for the purpose set forth.

3. The combination, in a doffer-comb head, of the reservoir A, vibrating comb-shaft B, provided with downward-projecting arm H, the chambered driving-shaft C C', bearing-sleeve D, having extended ends $D^1$ and $D^2$, and connecting-bar F, provided with pins $F^1$ $F^2$, said parts being constructed and organized for operation substantially as hereinbefore set forth.

Witness my hand this 25th day of July, A. D. 1878.

EDWARD WRIGHT.

Witnesses:
CHAS. H. BURLEIGH,
J. W. SMITH.